United States Patent [19]

Lockwood et al.

[11] Patent Number: 5,027,257

[45] Date of Patent: Jun. 25, 1991

[54] DESKSIDE COMPUTER HOUSING

[75] Inventors: Alfred Lockwood, Palo Alto; Philip G. Yurkonis, Campbell; James G. Ammon, San Jose, all of Calif.

[73] Assignee: Sun Microsystems, Inc., Mountain View, Calif.

[21] Appl. No.: 462,099

[22] Filed: Jan. 8, 1990

[51] Int. Cl.⁵ .......................... H02B 1/20; H05K 7/20
[52] U.S. Cl. ................................. 361/428; 361/383; 361/394; 361/395; 361/413; 361/415; 16/DIG. 13; 16/232
[58] Field of Search ................. 16/DIG. 13, 231, 232, 16/265, 266; 174/16.1, 68.3, 101; 361/338, 340, 342, 380, 383, 391, 393, 394, 395, 428, 429, 384, 413, 415; 364/708; 439/924; 211/41

[56] References Cited

U.S. PATENT DOCUMENTS

| 3,956,673 | 5/1976 | Seid | 361/383 |
| 4,006,388 | 2/1977 | Bartholomew | 174/16.1 |
| 4,304,966 | 12/1981 | Beirn et al. | 361/415 |
| 4,748,540 | 5/1988 | Henneburg et al. | 361/383 |
| 4,922,382 | 5/1990 | Hobbins | 361/394 |

FOREIGN PATENT DOCUMENTS

| 3335884 | 4/1985 | Fed. Rep. of Germany | 174/101 |
| 2118370 | 10/1983 | United Kingdom | 361/383 |

Primary Examiner—Leo P. Picard
Assistant Examiner—Michael W. Phillips
Attorney, Agent, or Firm—Blakely Sokoloff Taylor & Zafman

[57] ABSTRACT

The present invention is a deckside computer workstation housing which includes a frame assembly having at least one vertically oriented slot formed therein for insertion of a plug-in circuit board in a vertically oriented manner.

20 Claims, 3 Drawing Sheets

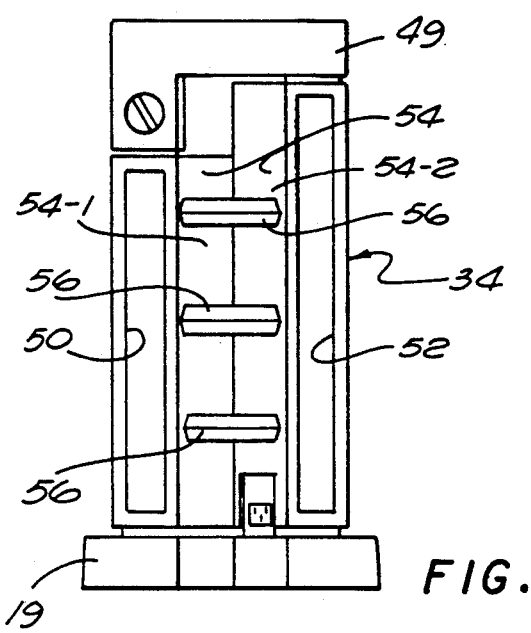
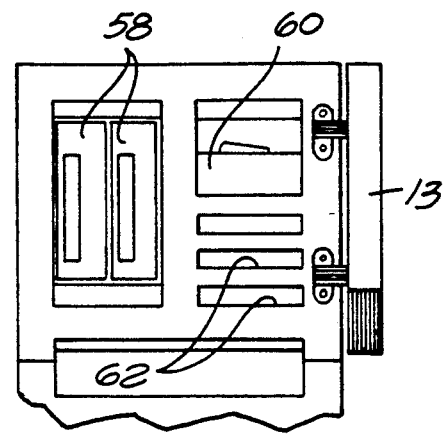
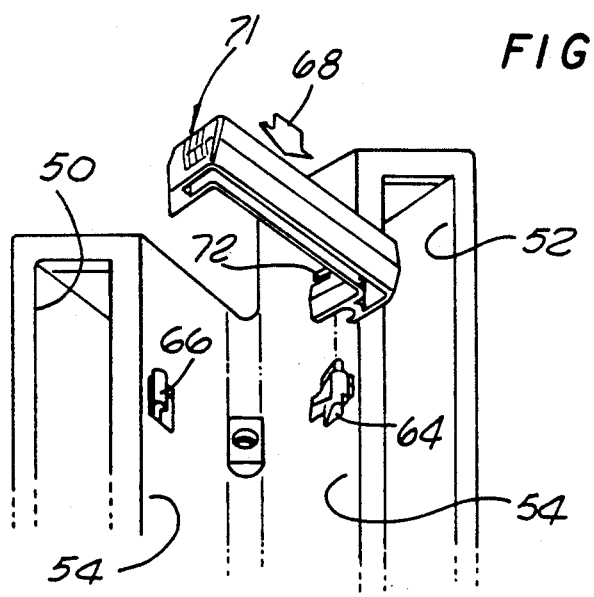
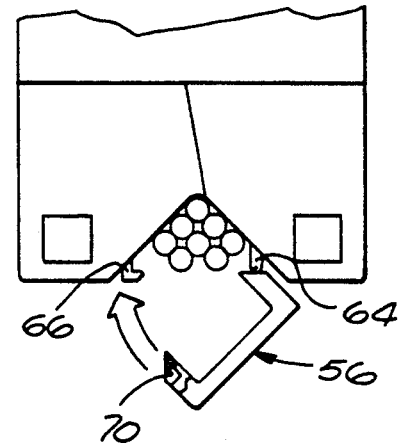

DESKSIDE COMPUTER HOUSING

BACKGROUND OF THE INVENTION

1. Field of the Invention

The present invention relates to computer housings and more particularly to deskside computer housings which use plug-in circuit boards.

2. Related Applications

This application is related to copending U.S. patent application Ser. No. 07/461,992, filed 1-8-90, and entitled "CABLE MANAGEMENT APPARATUS FOR A COMPUTER WORKSTATION HOUSING".

3. Description of the Related Art

Computer housings for desktop computers have been known in the art to contain both horizontally and vertically oriented slots for insertion of plug-in circuit boards.

However, heretofore, deskside, stand-alone computers have used housings which only contain horizontally installed boards. Typically, plug-in boards are inserted from the back or the side of the housing in a horizontal direction. In either case, the plug-in boards are typically inserted in a manner such that the connectors of the plug-in boards are exposed through the rear of the housing. This orientation makes access to boards difficult because the deskside computer housing is typically positioned against the wall under a desk. Furthermore, having the vulnerable parts of the cabling (strain relief and connection points to the plug-in boards) face rearward, these vulnerable parts are often damaged when the housing is pushed against a wall or furniture—a common cause of equipment failure. Additionally, while inserting the plug-in board from the side of the housing, the housing is being pushed sideways, thus likely to cause the deskside computer to roll away.

Deskside computer systems presently used have air-cooling mechanisms in which air is passed through the housing from top to bottom, bottom to top, front to sides, front to back or any other combination thereof. However, the use of horizontally inserted plug-in boards precludes the ability to pass cooling air from the front of the housing to the back, which is the more efficient way, because air can travel in a straighter path than the other cases. Additionally, the use of vents on the top or bottom of the housing allow dust or other foreign matter to more easily enter the machine.

SUMMARY OF THE INVENTION

The present invention is a deskside computer housing which includes a frame assembly having at least one vertically oriented slot formed therein for insertion of a plug-in circuit board in a vertically oriented manner. The vertical installation of the plug-in boards has the advantage that the boards can be inserted and removed by the user from the top of the unit, which is easy to access. The vulnerable parts of the cabling face upward, instead of rearward. This protects these parts from being pushed against a wall or furniture. Furthermore, because of the high force required to engage the boards with the mother board connectors, it is much easier to push down on the boards, As comparted to, for example, pushing sideways the deskside computer is less likely to roll away.

Additionally, the arrangement of the present invention allows cooling air to be drawn from the front of the machine to the back. This derives additional advantages. Front to rear cooling is more efficient than pulling air from the top and blowing it into the ground because the air can travel in a straighter, more direct path through the housing, eliminating vents from the top, reducing the amount of dust or liquids falling into the machine, and removing concern over blocked air flow from users laying items on the vent surfaces. Fans are located in the rear, reducing the apparent noise and routing air away from the user. Furthermore, major components such as VME boards, power supplies and disk drives, may be located side by side, so that they are not cooled by preheated air.

BRIEF DESCRIPTION OF THE DRAWINGS

FIG. 6 is a rear elevational view of the plenum of the present invention.

FIG. 7 is a view of the front of the deskside computer housing with the front door open.

FIG. 8 is a partial front perspective of the plenum of the deskside computer housing of the present invention.

FIG. 9 is a front elevational view of a retaining member of the present invention looking inside its ends.

FIG. 10 is a top view of the plenum of the deskside computer housing.

The same elements or parts throughout the figures of the drawings are designated by the same reference characters.

DETAILED DESCRIPTION OF THE INVENTION

Figure 1:
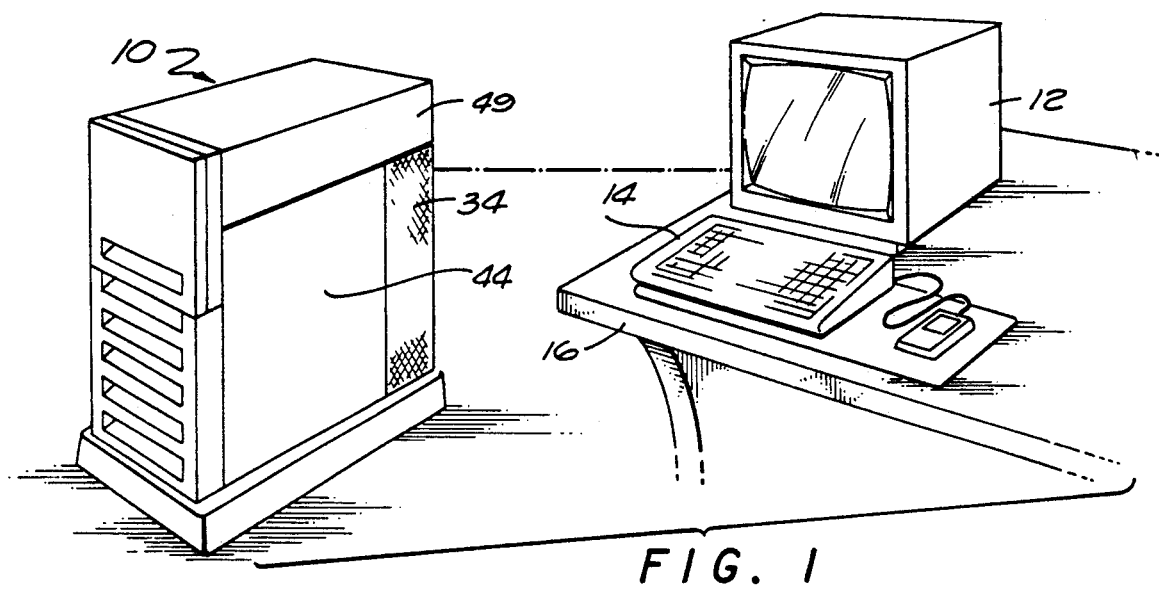
FIG. 1 illustrates a perspective view of the deskside computer housing of the present invention in conjunction with a desktop display monitor and keyboard.

Referring to the drawings and the characters of reference marked thereon, the deskside computer housing of the present invention is shown designated generally as 10. In FIG. 1, the deskside computer housing 10 is shown in proximity to a computer controlled display device 12 and associated keyboard 14. The deskside computer housing 10 is shown to the side of the desk 16; however, such deskside computers housing 10 are often positioned against the wall underneath the desk. As shown in this figure, when fully assembled, the deskside computer housing 10 has numerous covers 34, 44, 49 so that when fully assembled the deskside computer housing 10 is substantially rectangular.

Figure 2:
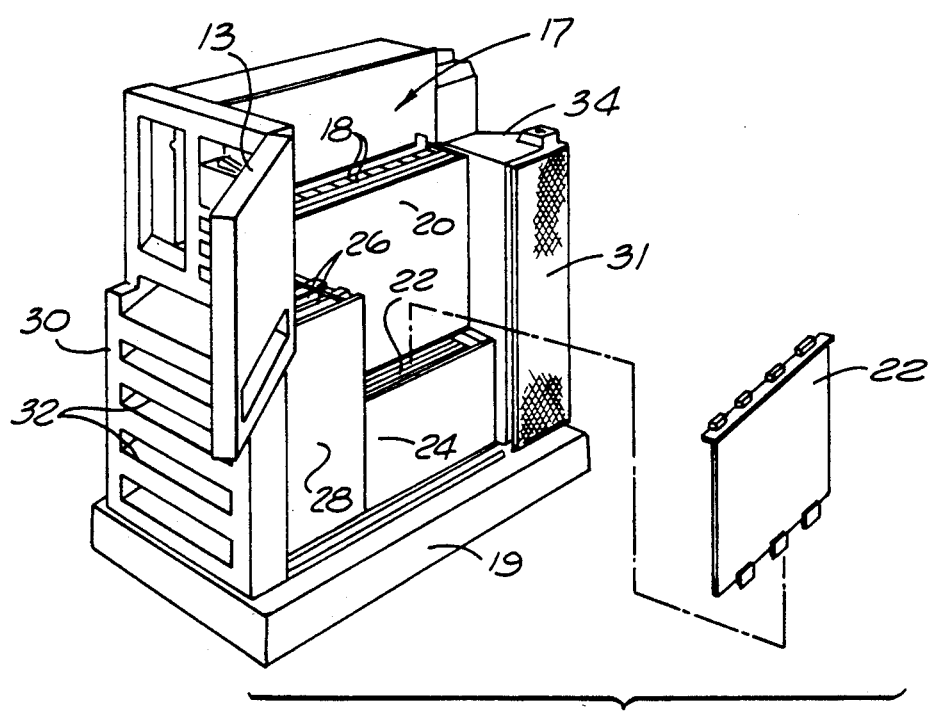
FIG. 2 is a front perspective view of the deskside computer workstation housing with the front door opened and the side and top covers removed.

Referring now to FIG. 2, the deskside computer housing is illustrated with the covers 34, 44, 49 removed to expose a frame assembly 17 having a stepped top surface having vertically oriented slots formed therein adapted for insertion of plug-in circuit boards having a first connecting means at a first side and a second connecting means at a second side an example of such a circuit board designated 22. The frame assembly 17 is supported by a base 19.

Figure 3:
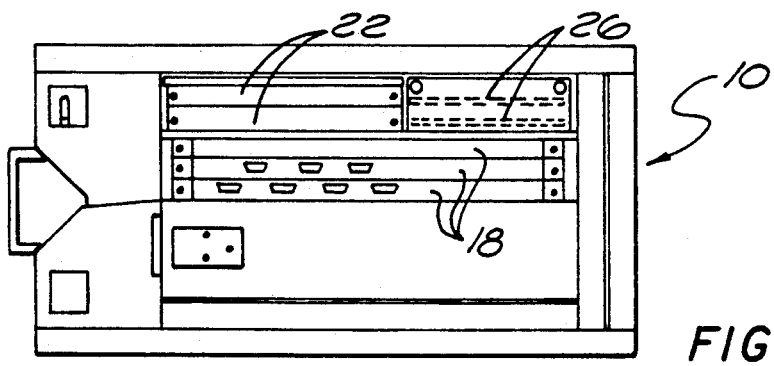
FIG. 3 is a top view of the deskside computer housing with the top and right side covers removed.

Referring to FIGS. 2 and 3, a perspective side view and a top view of the deskside computer housing 10 are respectively illustrated with top cover 49 removed. Three 9-U circuit cards 18 ("U" a VME bus standard representative of the size of the card) are positioned along a centrally disposed step 20. Two 6-U cards 22 are disposed on lower step 24, and two memory expansion cards 26 are disposed on step 28.

Referring again to FIG. 2, the deskside computer housing 10 includes a front plastic bezel 30 with a plurality of horizontally disposed slots 32 for the introduction of cooling air. Deskside computer housing 10 also includes a rear plenum cover 34 which has various slots for allowing the exiting of cooling air, as will be described below.

Figure 4:
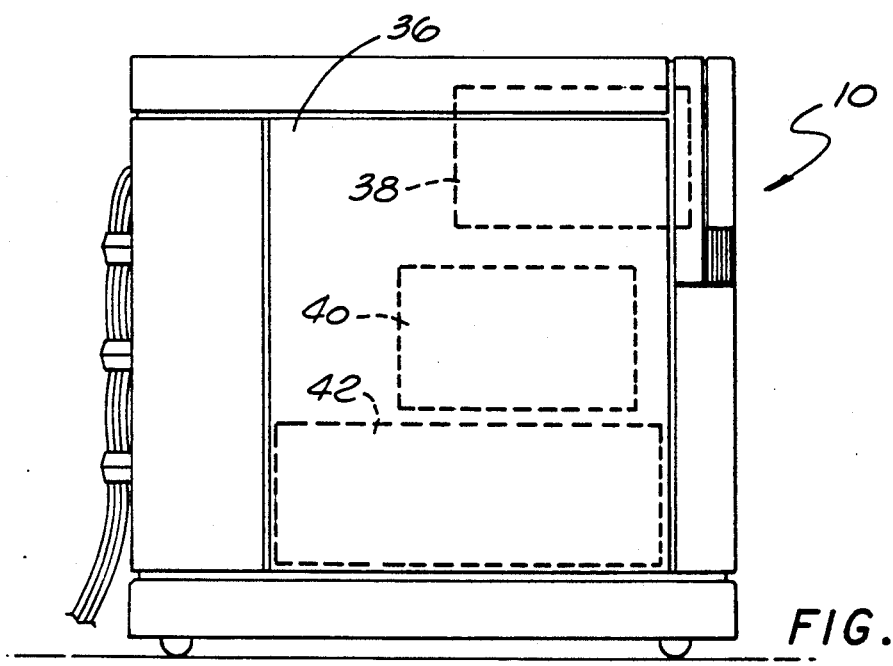
FIG. 4 is a left side view of the deskside computer housing showing various components in phantom.

Referring now to FIG. 4, the left side of the deskside computer housing 10 is illustrated. Disposed beneath the side access cover 36 is an optional tape or hard drive 38, optional hard drive 40, and a power supply 42.

Figure 5:
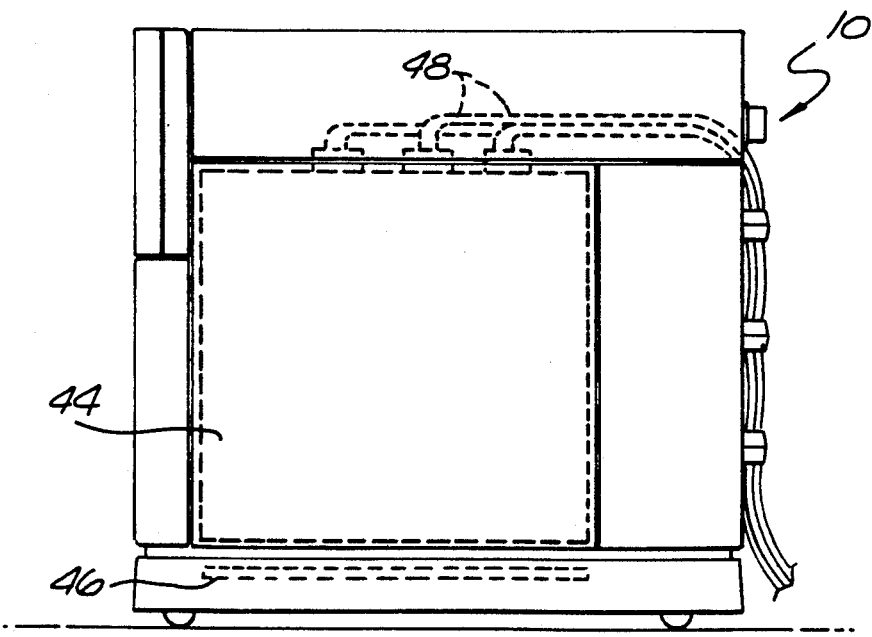
FIG. 5 is a right side view illustrating plug-in boards and cables in partial phantom.

Referring now to FIG. 5, a right side deskside computer housing 10 is illustrated. The side access cover 44 provides access for the memory expansion cards 26 and the 6-U cards 22. The circuit boards plug into the mother board 46 shown in phantom. Cables 48 extend from the top of the circuit boards and are directed toward the rear of the housing. At this point the cables 48 spill down the rear of the deskside computer housing 10, as will be described in detail below.

Referring now to FIG. 6, the plastic rear plenum cover 34 is illustrated in position between top cover 49 and base 19. The plenum cover 34 provides the novel cable management abilities of the present invention. The plenum cover 34 includes vertical slots or exit vents 50, 52. The exit vents 50, 52 cooperate with entrance vents 32 to allow effective front to rear cooling. The rear plenum cover 34 also includes side perforation 31 (FIG. 2) to assist in the exit of cooling air. Disposed between vents 50, 52 are angularly disposed first and second sides 54-1, 54-2 which form a V-shaped trough 54. The V-shaped trough 54 is centered in the rear surface. Additionally, the first side 54-1 is shorter than the second side 54-2, leaving an opening between the rear plenum cover 34 and the top cover 49 for the cables 48 to exit from the interior and spill down the rear side of the deskside computer housing 10.

The cable management apparatus includes vertically spaced rigid members 56 which retain the cables as the cables descend down the outer rear surface of the deskside computer housing 10.

Referring now to FIG. 7, the upper front portion of the computer workstation is illustrated, the front door 13 being shown in an open position. The front portion includes drives 58, power switch 60 and air intake vents 62.

Referring now to FIG. 8, the retaining mechanism for the cable management apparatus of the present invention is illustrated. A hinge element 64 is fixed to one side 54-2 of the V-shaped and an associated catch element 66 is located at the same elevation as the hinge element 64 but on the other side 54-1 of the V-shaped trough 54.

Referring now to FIG. 9, it can be seen that the rigid member 56 includes a restraining tab 67 on one end which cooperates with hinge element 64 on one side 52-2 of the V-shaped trough 54. As shown in FIG. 8, the rigid member 56 may be inserted onto the hinge element 64 from the top as indicated by arrow 68, a hinging action resulting. The rigid member 56 may only be inserted when the rigid member is in the "open" orientation. That is, when the rigid member is attached and a hinging action results, the hinge is in the open position. Once the rigid member 56 is attached and closed, it can not be pulled upward off the hinge.

As illustrated in FIG. 10, it may be seen that the other end of the rigid member 56 includes an interior snap 70. The interior snap cooperates with snap element 66 to allow the rigid member 56 to snap into position. To release the catch element end of the rigid member 56 a compressive force may be applied to the serrated surface 71 of the rigid member to disengage the snap 70 from the catch 66. Thus, the rigid member 56 may be opened to allow insertion or removal of cables.

Referring again to FIG. 8, it may be seen that the end of the rigid member 56 which contains the restraining tab 67 has a slit 72. The slit provides sufficient flexibility to the portion of the rigid member 56 that contains the restraining tab 67 to allow the rigid member 56 to be pulled off the hinge element without damaging the deskside computer housing 10. In addition, if the rigid member 56 is forced to an overextended open position (which may occur from an inadvertent force due to someone pushing against the rigid member when the rigid member is in an open position), the rigid member 56 will not break due to the force, but will pop-off cleanly without breakage.

By combining the hinge with a positive snap, there is little chance of the rigid member 56 accidently falling off. It cannot be removed when the rigid member 56 is snapped shut. The rigid member 56 is removed by placing the rigid member 56 in the open position and pulling up.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A deskside computer housing, said deskside computer housing comprises at least one plug-in circuit board having at least a first connecting means at a first side and a second connecting means at a second side, said first connecting means mates with a third connecting means of another component enclosed within said deskside computer housing coupling said plug-in circuit board to said component, said second connecting means mates with a fourth connecting means of a cable, said cable extending external to said deskside computer housing to couple said plug-in circuit board to an external device, said deskside computer housing comprising:

a frame assembly having a rear surface and a top surface and at least one vertically oriented slot formed on said top surface which receives of said plug-in circuit board in a vertically oriented direction and results in said second connecting means being disposed on said top surface of said frame assembly;

a cover assembly comprising a plurality of covers enclosing said frame assembly, said cover assembly cooperates with said frame assembly such that cables of said fourth connecting means of said external device exit said deskside computer housing, said fourth connecting means of said external device mates with said second connecting means of said plug-in board at said top surface of said frame assembly; and said plurality of covers of said cover assembly comprising a top cover that forms an opening with said rear surface such that said cables of said fourth connecting means exit said deskside computer housing, and said rear surface further comprising at least one cable retainer attached to said rear surface retaining said cable exiting said deskside computer housing.

2. The deskside computer housing of claim 1, wherein said top surface of said frame assembly comprises a plurality of steps and a plurality of said vertically oriented slots formed on said steps.

3. The deskside computer housing of claim 2, wherein said frame assembly further comprises;
a front surface having a plurality of front inlet vents formed therein; and
said rear surface having a plurality of rear outlet vents formed therein;
said vertically oriented slots and said other components of said deskside computer occupy planes that are substantially perpendicular to said front and rear surfaces thereby allowing said front and rear vents to provide front to rear air cooling.

4. The deskside housing of claim 3, wherein said cable retainer includes a rigid, U-shaped member with first and second ends being securably attached to said rear surface.

5. The deskside computer housing of claim 4, wherein said rear surface includes a catch and a hinge being so arranged and constructed so as to cooperatively mate with said first and second ends, respectively.

6. The deskside computer housing of claim 5, wherein said first and second ends of said U-shaped members are sufficiently long such that said U-shaped member extends beyond the rear surface so as to serve as a bumper for said deskside computer housing.

7. The deskside computer of claim 6, wherein said rear surface includes a vertical trough formed therein, a plurality of said cable retainers disposed along said trough so as to retain said cables.

8. The deskside computer housing of claim 2, wherein said plurality of said covers of said cover assembly comprises:
a front door covering a front surface of said frame assembly;
a base covering a bottom surface of said frame assembly and supporting said frame assembly; and
a rear plenum cover covering a rear surface of said frame assembly.

9. The deskside computer housing of claim 8, wherein said front cover includes a front surface having a plurality of front inlet vents formed therein.

10. The deskside computer housing of claim 9, wherein said rear plenum cover has a rear surface having a plurality of rear outlet vents formed therein, and said vertically oriented slots and said other components of said deskside computer are disposed in planes that are substantially perpendicular to said front door and said rear plenum cover thereby allowing said front and rear vents to provide front to rear air cooling.

11. The deskside computer housing of claim 10 wherein said rear plenum cover has a side surface comprising perforations assisting front to rear cooling.

12. The deskside computer housing of claim 10, wherein said plurality of covers of said cover assembly further comprises a top cover that forms an opening with said rear plenum cover such that said cables of said fourth connecting means exit said deskside computer housing, and said rear plenum cover further comprising at least one cable retainer attached to said rear surface retaining said cables exiting said deskside computer housing.

13. The deskside computer housing of claim 12, wherein said cable retainer includes a rigid U-shaped member with first and second ends being securably attached to said rear surface.

14. The deskside computer housing of claim 13, wherein said rear plenum cover includes a catch element and a hinge element being so arranged and constructed so as to cooperatively mate with said first and second ends, respectively.

15. The deskside housing of claim 14, wherein said first and second ends of the said U-shaped members are sufficiently long such that said U-shaped member extends beyond the rear plunum cover so as to serve as a bumper for said deskside computer workstation.

16. The deskside computer housing of claim 15, wherein said rear plenum cover includes a vertical trough formed therein, a plurality of said cable retainers disposed along said trough so as to retain said cables.

17. A deskside computer housing, said deskside computer housing comprises at least one plug-in circuit board having at least a first connecting means at a first side and a second connecting means at a second side, said first connecting means mates with a third connecting means of another component enclosed within said deskside computer housing coupling said plug-in circuit board to said component, said second connecting means mates with a fourth connecting means of a cable, said cable extending external to said deskside computer housing to couple said plug-in circuit board to an external device, said deskside computer housing comprising;
a frame assembly having,
a top surface and at least one vertically oriented slot formed therein on said top surface which receives said plug-in circuit board in a vertically oriented direction and results in said second connecting means being disposed on said top surface of said frame assembly;
a front surface having a plurality of front inlet vents formed therein; and
a rear surface having a plurality of rear outlet vents formed therein;
said vertically oriented slots and said other components of said deskside computer are disposed in planes that are substantially perpendicular to said front and rear surface thereby allancing said front and rear vents to provide front to rear air cooling;
a cover assembly including a plurality of covers enclosing said frame assembly, said cover assembly cooperates with said frame assembly such that cables of said fourth connecting means exit said deskside computer housing, said fourth connecting means mates with said second connecting means of said plug-in board at said top surface of said frame assembly; and
said plurality of covers of said cover assembly comprises top cover that forms an opening with said rear surface of said frame assembly such that said cables of said fourth connecting means exit said deskside computer housing, and said rear surface of said frame assembly further comprising at least one cable retainer attached to said rear surface retaining said cables exiting said deskside computer housing.

18. The deskside computer housing of claim 17, wherein said top surface is a stepped surface having a plurality of vertically oriented slots formed on said steps, which receive plug-in circuit boards 19. A deskside computer housing, said deskside computer housing comprises at least one plug-in circuit board having at least a first connecting means at a first side and a second connecting means at a second side, said first connecting means mates with a third connecting means of another component enclosed within said deskside computer housing coupling said plug-in circuit board to said component, said second connecting means mates with a fourth connecting means of a cable, said cable extending external to said deskside computer housing to couple said plug-in circuit board to an external device, said deskside computer housing comprising:

a frame assembly having a top surface and at least one vertically oriented slot formed therein on said top surface which receives said plug-in circuit board in a vertically oriented direction and results in said second connecting means being disposed on said top surface of said frame assembly; and a cover assembly enclosing said frame assembly comprising, a front door covering a front surface of said frame assembly, said front door having a plurality of front inlet vents formed therein;

a base covering a bottom surface of said frame assembly and supporting said frame assembly; and a rear plenum cover covering a rear surface of said frame assembly, said rear plenum cover having a plurality of rear outlet vents formed therein;

said vertically oriented slots and said other components of said deskside computer are disposed in planes that are substantially perpendicular to said front door and said rear plenum cover thereby allowing said front and rear vents to provide front to rear air cooling;

said cover assembly cooperates with said frame assembly such that cables of said fourth connecting means exit said deskside computer housing, said fourth connecting means mates with said second connecting means of said plug-in board at said top surface of said frame assembly; and said cover assembly further comprises a top cover that forms an opening with said rear plenum cover such that cables of said fourth connecting means exit said deskside computer housing, and said rear plenum cover further comprising at least one cable retainer attached to said rear plenum cover retaining said cables exiting said deskside computer housing.

20. The deskside computer housing of claim 19, wherein said top surface is a stepped surface having a plurality of vertically oriented slots formed on said steps.

* * * * *

UNITED STATES PATENT AND TRADEMARK OFFICE
CERTIFICATE OF CORRECTION

PATENT NO. : 5,027,257
DATED : June 25, 1991
INVENTOR(S) : Lockwood et al.

It is certified that error appears in the above-identified patent and that said Letters Patent is hereby corrected as shown below:

In column 1 at line 62, please delete " , " and insert -- . --.

In column 3 at line 16, please insert -- view of the -- before deskside.

In column 3 at line 47, please delete " the computer " and insert -- the deskside computer --.

In column 3 at line 47, please delete " workstation " and insert -- housing 10 --."

In column 3 at line 54, after V- shaped, please insert -- trough 54 --.

In column 3 at line 60, please delete " 52-2 " and insert -- 54-2 --.

In column 6, claim 15, at line 13, please delete " plunum " and insert -- plenum --.

In column 6, claim 17, at line 45, please delete " allancing " and insert -- allowing --.

Signed and Sealed this

Tenth Day of June, 1997

*Attest:*

BRUCE LEHMAN

*Attesting Officer*   *Commissioner of Patents and Trademarks*